IMAGE REPRODUCING ARRANGEMENT AND METHOD

Filed Oct. 9, 1963 8 Sheets-Sheet 1

Inventors
Wilhelm Ritzerfeld
Gerhard Ritzerfeld
by Michael S. Striker
Atty

IMAGE REPRODUCING ARRANGEMENT AND METHOD

Filed Oct. 9, 1963 8 Sheets-Sheet 2

Jnventors
Wilhelm Ritzerfeld
Gerhard Ritzerfeld
by Michael J. Striker
Att

Jnventors
Wilhelm Ritzerfeld
Gerhard Ritzerfeld
by Michael J. Striker
Atty

June 28, 1966 W. RITZERFELD ET AL 3,257,942

IMAGE REPRODUCING ARRANGEMENT AND METHOD

Filed Oct. 9, 1963 8 Sheets-Sheet 4

Inventors
Wilhelm Ritzerfeld
Gerhard Ritzerfeld
by Michael S. Striker
Atty

IMAGE REPRODUCING ARRANGEMENT AND METHOD

Filed Oct. 9, 1963 8 Sheets-Sheet 5

Inventors
Wilhelm Ritzerfeld
Gerhard Ritzerfeld
by Michael J. Striker
Att'y

June 28, 1966 W. RITZERFELD ET AL 3,257,942

IMAGE REPRODUCING ARRANGEMENT AND METHOD

Filed Oct. 9, 1963 8 Sheets-Sheet 6

Jnventors
Wilhelm Ritzerfeld
Gerhard Ritzerfeld by Michael S. Striker

IMAGE REPRODUCING ARRANGEMENT AND METHOD

Filed Oct. 9, 1963 8 Sheets-Sheet 7

Jnventors
Wilhelm Ritzerfeld
Gerhard Ritzerfeld by Michael J. Striker
Atty

Inventors
Wilhelm Ritzerfeld
Gerhard Ritzerfeld
by Michael S. Striker
Atty

United States Patent Office 3,257,942

Patented June 28, 1966

3,257,942
IMAGE REPRODUCING ARRANGEMENT AND METHOD

Wilhelm Ritzerfeld, Schorlemer Allee 14, Berlin-Dahlem, Germany, and Gerhard Ritzerfeld, Franzensbader 21, Berlin-Grunewald, Germany Filed Oct. 9, 1963, Ser. No. 315,060
Claims priority, application Germany, Feb. 5, 1963, R 34,389
14 Claims. (Cl. 101—149.4)

Figure 1:
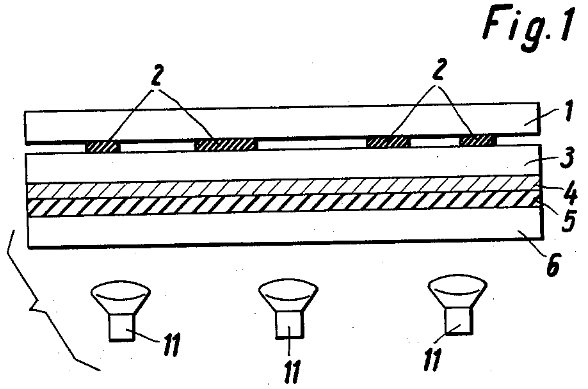
Figure 2:
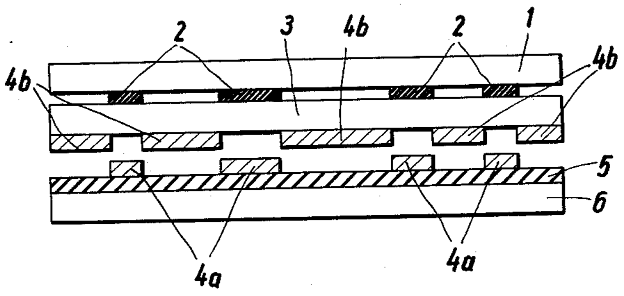

The present invention relates to an image reproducing arrangement and method, particularly suitable for producing copies or hectographic masters from an original image such as a pattern, photograph or printed sheet.

This application is a continuation-in-part of our copending application Serial No. 113,986, filed May 15, 1961, and now abandoned, and entitled "Image Reproducing Arrangement and Method."

It has been proposed to produce transferrable images on hectographic master sheets by applying infrared heat to the image-forming portions of an hectographic ink sheet so as to melt these portions of the hectographic ink layer and to transfer the molten portions from the ink sheet to an intermediate sheet or master blank interposed between the original image and the ink sheet.

However, to proceed in this matter requires the heating of the image forming portion of the hectographic ink layer to above the melting point of the same since the molten portions of the hectographic ink layer are expected to adhere to corresponding portions of the master blank, thus forming a hectographic ink pattern corresponding to the image on the master blank. However, it has been found that hectographic masters produced in this manner will give only blurred copies with very poor definition and lack of sharpness. This is due to the fact that it apparently is impossible in this manner to limit the melting and the transfer of the hectographic ink layer exactly to the portions corresponding to the image which is to be reproduced. It seems to be unavoidable that adjacent portions of the ink layer which do not correspond to the desired image which is to be reproduced, will also be transferred from the hectographic ink sheet to the master and this in turn will result in blurring of copies made from a thus produced master.

It is therefore an object of the present invention to overcome the above discussed difficulties and disadvantages.

It is a further object of the present invention to provide a method and arrangement for reproducing an image which method and arrangement will permit the transfer of portions of a layer of coloring material onto a master or copy sheet in such a manner that the thus-transferred portion of coloring material will correspond exactly to the image which is to be reproduced.

Other objects and advantages of the present invention will become apparent from a further reading of the description and of the appended claims.

With the above and other objects in view, the present invention contemplates a method of reproducing an image, comprising the steps of forming a multilayer structure including sheet means defining an image comprising image forming and image free portions, a layer of coloring material adhering to one face of the sheet means, a backing sheet, and a layer of latently adhesive material adapted to become actively adhesive at an elevated temperature below the softening point of the coloring material, interposed between the layer of coloring material of the sheet means and the backing sheet, the adhesive material being of such composition that by heating to the elevated temperature and subsequent cooling its bond to contacting portions of the layer of coloring material is stronger than the bond of the portions of the layer of coloring material to the sheet means, the image forming portions of the sheet means having a greater specific heat transfer capacity than the image free portions thereof so that upon exposure of the sheet means to predetermined infrared radiation portions of the layer of latently adhesive material corresponding to the image forming portions will be heated to the elevated temperature and thus activated while portions of the layer of latently adhesive material corresponding to the image free portions will remain below the elevated temperature, exposing the multilayer structure to the predetermined infrared radiation, allowing the thus activated portions of the layer of latently adhesive material to cool below the elevated temperature, and separating the backing sheet from the sheet means, whereby the portions of the adhesive layer and of the coloring layer corresponding to the image forming portions of the sheet means will firmly adhere to the backing sheet thus reproducing the image thereon.

The present invention also contemplates for use in an image reproducing arrangement, a composite sheet comprising, in combination, a backing sheet, a layer of latently adhesive material adapted to become actively adhesive at a predetermined elevated temperature, and a layer of coloring material interposed between and adhering to the backing sheet and the layer of latently adhesive material, the layer of coloring material having a softening point higher than the first elevated temperature and the adhesive material being of such composition that by heating to the predetermined elevated temperature and subsequent cooling its bond to contacting portions of the layer of coloring material is stronger than the bond of the portions of the layer of coloring material to the backing sheet.

Thus, according to one embodiment of the present invention, the backing sheet to which the image forming portions of the coloring layer are to be transferred, is covered with a latently adhesive material which will become actively adhesive at a temperature which is below the softening temperature of the coloring material. The latently adhesive layer of the master or copy sheet is then contacted with the coloring layer of a hectographic ink sheet or of a carbon paper or the like and infrared radiation is applied to a sheet carrying an original image which is to be reproduced, which image carrying sheet contacts either the backing sheet for the hectographic ink layer or the like, or the sheet onto which a portion of the coloring material is to be transferred. The infrared radiation will heat the image forming portions of the original image to a higher temperature than the image free portions thereof, or will be reflected from the image forming portions to a higher degree than from the image free portions of the original image and the reflected radiation or the heat from the image forming portions will cause activation of corresponding portions of the adhesive layer. The thus activated adhesive layer will firmly adhere to its own backing sheet on the one hand, and to the corresponding portions of coloring material on the other hand, so that upon cooling of the arrangement and separation of the different sheets, the copy or master sheet will carry on its adhesive layer the portions of the coloring material which correspond to the portions of the adhesive layer which has been activated, i.e. which correspond to the image which is to be reproduced. It is of course important that the adherence between the activated portions of the adhesive layer and the corresponding portions of the layer of coloring material, after cooling of the adhesive layer, is stronger than the adherence of the respective portions of the coloring layer to its own backing sheet.

Preferably, the image is produced on a sheet covered on one face with a latently adhesive layer adapted to be activated by heat and consisting of a dispersion of a synthetic resin with a suitable softener. However, the present invention is not to be considered limited to specific compositions of the adhesive layer. It is essential, however, that the adhesive layer consists of a material which can be heat activated at a temperature below the softening point of the coloring layer used in connection therewith, and which adhesive upon being activated and subsequently cooled will adhere more firmly to corresponding portions of the coloring layer than such portions of the coloring layer will adhere to their original backing sheet.

Thus, if the coloring layer consists of a material having a very high softening point, then the activation temperature of the adhesive material may also be relatively high, however, of course, it must below the softening temperature of the coloring material.

According to another embodiment of the present invention, the sheet from which the coloring material is to be transferred onto the master or copy sheet will be formed with the latently adhesive layer covering the layer of coloring material. In such case, the master or copy is formed on a sheet which need not contain any special surface coating. Such blank sheet is brought in contact with the adhesive layer adhering to and covering the coloring layer of the hectographic ink sheet or carbon paper, and upon heating of the image-corresponding portions of the adhesive layer by infrared radiation and subsequent cooling, it will be achieved that the thus heated portions of the adhesive layer will firmly adhere to corresponding portion of the coloring layer on the one hand and to the master or copy blank on the other hand, so that upon separation of this sheet, these image representing portions of the adhesive and coloring layers will adhere to the master or copy blank.

In a further development of the last described embodiment, it is also possible to interpose between the coloring layer and the adhesive layer in an intermediate layer consisting of a material which will not absorb infrared radiation and which, of course, must adhere firmly to the adjacent coloring layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1, 3, 5, 7, 13, 15, 17, 19, 21 and 23 are schematic illustrations of arrangements according to the present invention during infrared radiation of the same; and FIGS. 2, 4, 6, 8, 9, 10, 11, 12, 14, 16, 18, 20, 22 and 24 schematically illustrate the separation of the reproduced image.

Referring now to the drawing and particularly to FIG. 1, an image carrying sheet member 1 is shown having image-forming portions 2 and interposed image-free portions. Image carrying sheet 1 is superposed upon backing sheet 3 to which a layer of coloring material 4 adheres. Backing sheet 3 with layer of coloring material 4 are superposed upon latently adhesive layer 5 carried by and adhering to backing sheet 6. Adhesive layer 5 is heated to its activation temperature by reflex. Infrared radiation supplied by infrared radiators 11 will penetrate through the illustrated arrangement and heat reflected from image forming portions 2 will cause activation of corresponding portion of adhesive layer 5.

Upon subsequent cooling of the arrangement and separation of backing sheet 6 from backing sheet 3, it will be found that the portions 4a of coloring layer 4 which correspond to the image forming portions 2 will adhere to adhesive layer 5, i.e. to the activated portions of adhesive layer 5 and thus to backing sheet 6, so that backing sheet 6 will now carry portions of coloring layer 4 which correspond to image forming portions 2, while the portions 4b of coloring layer 4 which were not in contact with activated portions of adhesive layer 5 will remain adhered to backing sheet 3.

Coloring layer 4 may be a hectographic ink layer consisting of a triphenylmethane red dye which is incorporated in a fat or wax base. Such hectographic ink layer normally has a softening point which is higher than 70° C. In combination therewith, an adhesive layer 5 may be used which is activated when heated to a temperature of about 62° C. or below. Preferably, adhesive layers are used which have a rather well defined activation point or temperature, for instance adhesive material which at temperatures which are only a few degrees lower, for instance at temperatures of about 55° C., will not be activated but which will be fully activated at a temperature slightly above 60° C. The suitable activation temperatures thus depend, on the one hand, on the softening point of the coloring layer, which must not be reached, and on the other hand on the composition of the adhesive layer which preferably consists of a mixture of synthetic resin and a suitable softener.

Figures 3, 4:
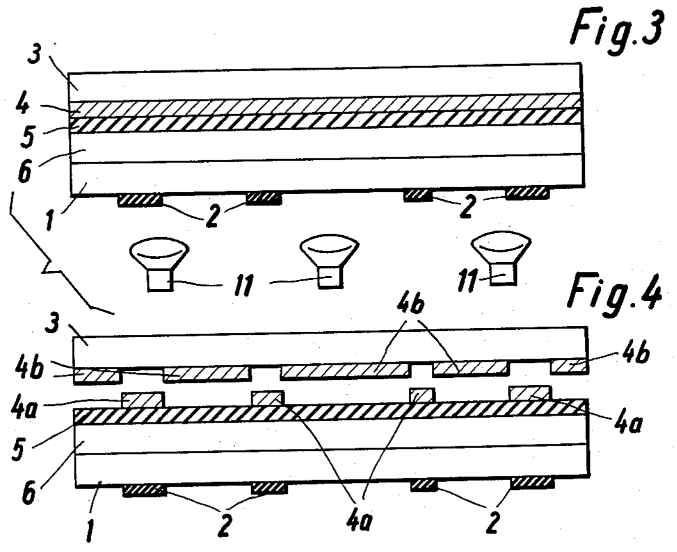

FIGS. 3 and 4 illustrate an arrangement and process according to the present invention, wherein infrared radiation is directly applied to the image carrying sheet member so that the image-forming portions 2 thereof will be heated and will conductively heat corresponding portions of adhesive layer 5.

Figures 5, 6:
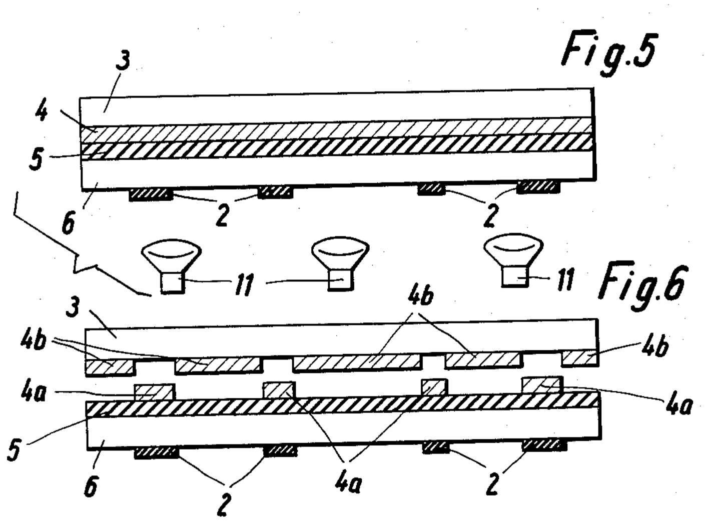

According to the embodiment illustrated in FIGS. 5 and 6, the image carrying sheet will also serve as backing sheet for adhesive layer 5 so that a hectographic mirror image of the image forming portions 2 will be produced at the opposite face of the image carrying sheet member which—since it is also the backing sheet for adhesive layer 5, is indicated in FIGS. 5 and 6 by reference numeral 6.

Figures 7, 8:
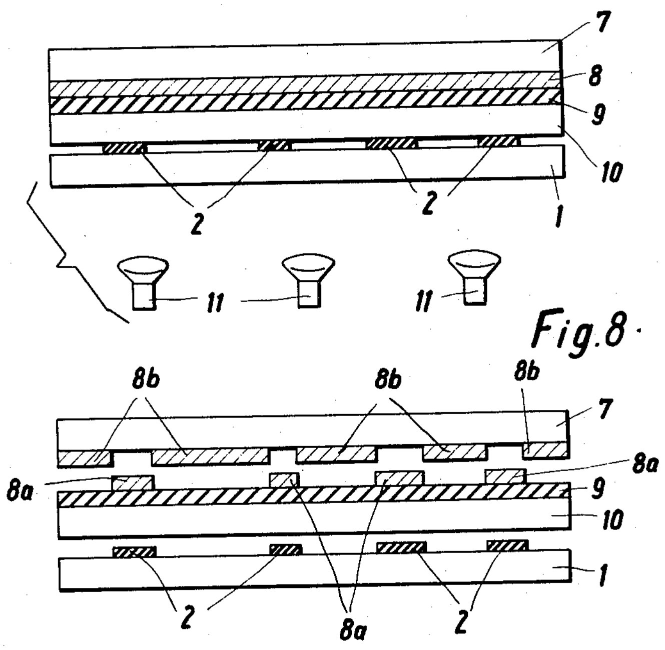

FIGS. 7 and 8 illustrate the production of a single copy according to the present invention. In this case, in place of the hectographic ink sheet indicated by reference numerals 3 and 4 in FIGS. 1, 3 and 5, a carbon paper which produces non-reproducible copies is used and is indicated by reference numerals 7 and 8. Reference numeral 7 indicates the backing sheet of the carbon paper, and reference numeral 8 the transferable but not reproducible layer thereon. The copy sheet comprises backing sheet 10 with adhesive layer 9 thereon. The copy sheet is placed with its adhesive layer contacting the transferable layer of the carbon paper, and image carrying sheet member 1 is placed on the copy sheet with image forming portions 2 facing backing sheet 10 of the copy sheet. Upon exposure by infrared radiation from radiator 11, portions of adhesive layer 9 corresponding to image forming portion 2 will be activated and will cause firm adherence thereto of corresponding portions 8a of transferable layer 8 of the carbon paper. FIG. 8 illustrates how after separation of the three backing sheet members a reproduction of image forming portions 2 has been formed on backing sheet 10 by portions 8a of the transferable layer of the carbon paper.

Figure 9:
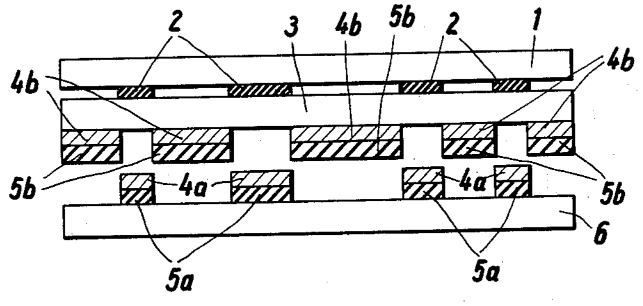

FIGS. 1 and 9 should be viewed together and illustrate the results obtained when a transfer member is used which comprises backing sheet 3, coloring layer 4 and adhesive layer 5 adhering to each other. In such a case a plain backing sheet 6 may be superposed upon adhesive layer 5 and, upon exposure, a reproduction of image forming portions 4 will be formed adhering to backing sheet 6 and consisting of adhesive layer portions 5a and coloring layer portions 4a.

Figure 10:
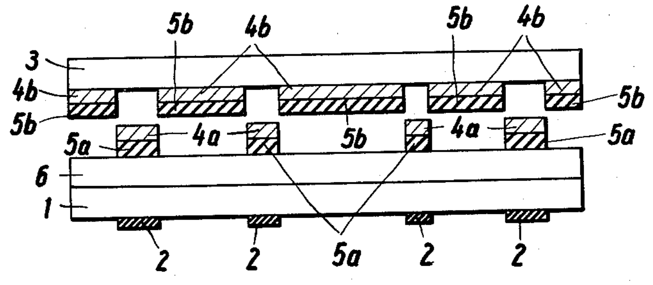

FIG. 10 should be viewed together with FIG. 3 and shows the result obtained with an arrangement according to FIG. 3, in which, however, the coloring layer 4 and adhesive layer 5, both initially adhere to backing sheet 3.

Figure 11:
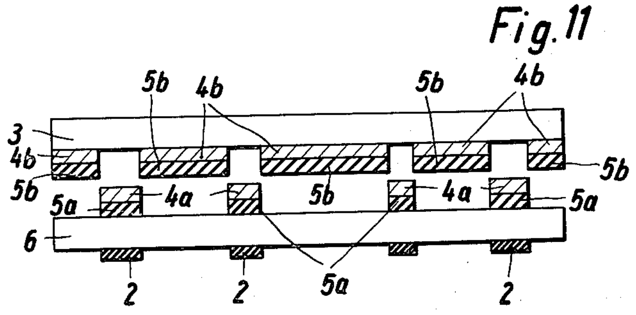

FIG. 11 should be viewed together with FIG. 5. Here again, FIG. 11 shows the reproduction of the image which is obtained by exposing an arrangement according to FIG. 5, in which, however, coloring layer 4 and adhesive layer 5 initially adhere to backing sheet 3.

Figure 12:
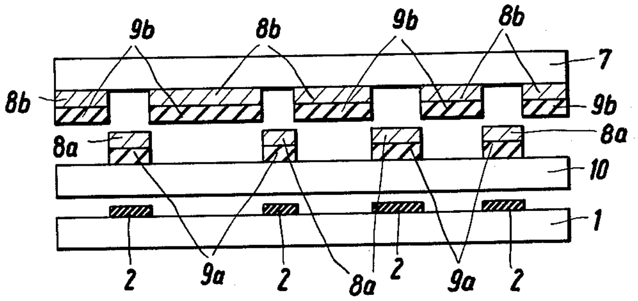
Figures 13, 14:
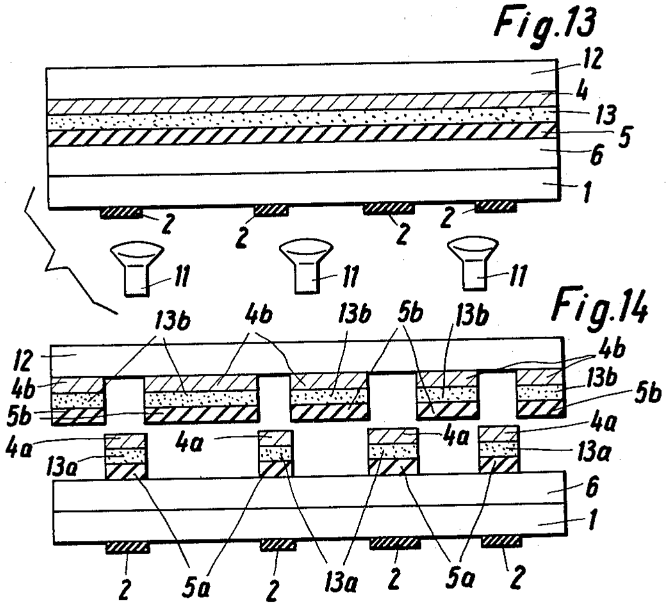

FIG. 12 should be viewed together with FIG. 7 and here again, the difference between the results shown here and in FIG. 8 are due to the fact that in order to obtain the reproduced image according to FIG. 12, in FIG. 7 layers 8 and 9 both initially adhere to backing sheet 7. FIGS. 13 and 14 illustrate an arrangement and process corresponding to that illustrated in FIGS. 3 and 10, however, according to FIGS. 13 and 14 a layer 13 is interposed between coloring layer 4 and adhesive layer 5. This intermediate layer 13 consists of a material which will not absorb infrared radiation, and this will result in a reproduction of the original image forming portions 2 which, as illustrated in FIG. 14 consists of three superposed layers, namely of portions 4*a* of the layer of coloring material, portions 13*a* of the intermediate layer and portions 5*a* of the adhesive layer.

In the case of a hectographic ink sheet, coloring layer 4, for instance, may have the composition described in Examples I and II. It is to be noted however that the present invention is not to be considered limited to the specific details of any of the following examples.

*Example I.—Composition of coloring layer 4*

| | G. |
|---|---|
| Petroleum jelly | 170 |
| Mineral oil | 70 |
| Wool fat or lanolin | 60 |
| Olein | 80 |
| Carnauba wax | 140 |
| Montan wax | 100 |
| Crystal violet | 590 |

*Example II.—Composition of coloring layer 4*

| | G. |
|---|---|
| Carnauba wax | 140 |
| Montan wax | 400 |
| Mineral oil | 400 |
| Petroleum jelly | 800 |
| Victoria blue | 1700 |

In the case of a carbon paper, i.e. when only a single copy is to be made according to the present invention, the coloring layer 4 may have the composition described in Example III.

*Example III*

| | G. |
|---|---|
| Carbon black | 300 |
| Milori blue | 200 |
| Mineral oil | 600 |
| Montan wax | 600 |
| Beeswax | 100 |

The adhesive layer 5 may consist of polymers of isobutylene, butyl rubber, abietyl alcohol, abietic acid esters, and preferably of polyterpenes such as polymerized beta pinenes of polymerized dipentenes having melting point of between 50 and 70° C., preferably 60° C.

The following examples will serve to describe the invention with reference to the figures of the drawing.

*Example IV (FIGS. 1–2)*

A hectographic ink sheet consisting of backing sheet 3 and a layer of hectographic ink 4 having the composition described in Example I and a thickness corresponding to 12 g./m.$^2$, is contacted with a hectographic master blank comprising backing sheet 6 weighing 40 grams per square meter and a layer 5 of polymerized beta pinenes having a melting point of 60° C. and a thickness of 0.02 mm.

As illustrated in FIG. 1, an image carrying sheet 1 is placed in contact with the backing sheet 3 of the hectographic ink sheet, and the thus formed arrangement of superposed sheets is subjected to reflex exposure with infrared rays emanating from infrared lamps 11. Exposure is continued for about 15 seconds.

In this matter it is possible to heat the portions of adhesive layer 5 which are juxtaposed to the image forming portions 2 of the original image, to a temperature above the melting point of the material of the adhesive layer, while the portions of the adhesive layer which are not juxtaposed to image forming portions 2 will not be heated to their softening point and thus will not become actively adhesive. Hectographic ink layer 4 also will not be heated to its softening point.

After completion of infrared exposure and allowing the superposed sheets to cool for about 2 minutes, backing sheets 3 and 6 may be separated from each other. Upon such separation, and as illusttared in FIG. 2, it will be found that the portions of the hectographic ink sheet which correspond to image forming portions 2 of the image which is to be reproduced, will adhere to the portions of adhesive layer 5 which previously had been heated to their activating temperature.

The thus formed hectographic master sheet may now be fixed to a commercial duplicating device and it is possible to produce about 200 clear and intensively colored copies therefrom.

*Example V (FIGS. 3 and 4)*

In the arrangement illustrated in FIGS. 3 and 4, a hectographic ink sheet is used having a composition as described in Example IV, however, the thickness of layer 4 now corresponds to 16 g./m.$^2$.

The master blank consist of a pergamyn type parchment-like paper weighing 60 g./m.$^2$, coated on one face with a layer consisting of polymerized dipentenes having a melting point of 65° C. Pergamyn paper is a grease-proof, imitation paper made from sulfite pulp by beating until gelatinous. The thickness of this layer 5 is 0.018 mm. After direct exposure to infrared radiation is illustrated in FIG. 3 for a period of about 8 seconds, cooling and separation of the sheets, as illustrated in FIG. 4, a hectographic master sheet is obtained from which up to about 300 sharp edged well defined and intensive copies can be produced.

*Example VI (FIGS. 5–6)*

A hectographic ink sheet similar to the one described in Example V is superposed onto a master blank formed of a backing sheet of half-glued cellulose paper weighing 70 g./m.$^2$ and of a latently adhesive layer applied in a thickness of 0.015 mm., having a melting point of 70° C. and consisting of 20% of a polyethylene wax having a molecular weight of about 2000, and 80% of polymerized dipentene. The image which is to be reproduced is formed, for instance by typewriter, on the uncoated face of backing sheet 6 of the hectographic master blank.

Exposure is carried out as described in Example V, and, after cooling and separation, the hectographic master sheet shown in FIG. 6 is obtained which comprises backing sheet 6 having original image forming portions 2 on one of its faces, and hardened adhesive layer 5 with hectographic ink portions 4*a*, corresponding to image forming portions 2, on its other face.

*Example VII (FIGS. 7–8)*

In order to product a single copy, a carbon paper consisting of backing sheet 7 and non-copying coloring layer 8 having a composition as described in Example III, is contacted with a master blank 9, 10 corresponding to the one described in Example V.

After direct exposure as illustrated in FIG. 7, cooling and separation of the sheets, a single copy as illustrated in FIG. 8 is obtained, comprising backing sheet 10, latently adhesive layer 9, and portions 8*a* of the coloring layer which correspond to image forming portions 2 of the original which is to be copied. It is to be noted that in this case the image forming portions 2 of sheet 1 face away from the source of infrared radiation, i.e.

face in the same direction as the adhesive layer 9 of the master blank.

*Example VIII (FIGS. 1–9)*

In this case, the assembly is formed of original image carrying sheet 1, 2, a backing sheet 6, and a composite sheet consisting of backing sheet 3, ink layer 4 and adhesive layer 5 adhering to each other. Backing sheet 3 is a half-glued crude paper weighting 60 g./m.². A hectographic ink layer having a thickness corresponding to 12 g./m.² and a melting point of 75° C. is applied to one face of the backing sheet. The composition of the ink layer corresponds to that described in Example II. An adhesive layer having a thickness of 0.015 mm., consisting of a mixture of 50% polymerized pinene and 50% polymerized dipentene and having a melting point of 55° C. is applied to the free face of hectographic ink layer 4.

Sheet 1 carrying image forming portions 2 is placed on backing sheet 3, as illustrated in FIG. 1, and the backing sheet 6 which is to form the backing sheet of the hectographic master, is placed on the free face of adhesive layer 5.

After exposure as illustrated in FIG. 1, the sheets are separated and, as shown in FIG. 9, a hectographic master is formed, comprising backing sheet 6 with portions 5*a* of the adhesive layer and portions 4*a* of the hectographic ink layer adhering thereto. The portions 5*a* and 4*a* are juxtaposed to and correspond to image forming portions 2 of the original image.

It is of course essential in order to carry out the present invention that the adherence between activated portions of the adhesive layer and corresponding portions of the coloring layer will be stronger than the adherence of the coloring layer to its original backing sheet so that upon activation of portions of the adhesive layer, the portions of the coloring layer which correspond to and contact the activated portions of the adhesive layer will adhere to the same and thus to the backing sheet to which these portions of the adhesive layer adhere. Upon separation of the backing sheets, these portions of the coloring layer will be torn off from their original backing sheet to which they adhere less strongly than to the previously activated portions of the adhesive layer.

*Example IX (FIGS. 3–10)*

Here again a hectographic ink sheet is used which includes a latently adhesive layer covering the ink layer, however, the thickness of ink layer 4 is increased so as to correspond to a weight of 16 g./m.². Direct exposure is carried out for 8 seconds as illustrated in FIG. 3, and after separation, a hectographic master sheet comprising backing sheet 6, adhesive layer portions 5*a* and hectographic ink portions 4*a* is obtained, as illustrated in FIG. 10.

*Example X (FIGS. 5–11)*

A hectographic ink sheet similar to the one of Example VIII is used, however, the adhesive layer covering the hectographic ink layer consists of polymerized dipentenes having a melting point of 65° C.

An image is formed, for instance by printing, on one face of a pure cellulose fiber paper having a weight of 60 g./m². The image carrying paper 6 is placed on adhesive layer 5 of the hectographic ink sheet and exposed as illustrated in FIG. 5. After cooling and separation, the hectographic master sheet shown in FIG. 11 is obtained which comprises backing sheet 6 having on one face imprints 2 and on the other face adhesive layer portions 5*a* and hectographic ink portions 4*a* which are juxtaposed and correspond to imprints 2.

*Example XI (FIGS. 7–12)*

For producing a single copy, a carbon paper is used, comprising a crude paper sheet 7 weighing 40 g./m.² and having on one face a coloring layer 8 of the composition described in Example 3. The weight of coloring layer 8 is 10 g./m.². A latently adhesive layer 9 covers and adheres to coloring layer 8. Layer 9 has a thickness of 0.012 mm. and consists of polymerized dipentene having a melting point of 65° C. Layers 8 and 9 may be applied to sheet 7 in one continuous operation. Backing sheet 10 weighs 60 g./m.² and may consist of any suitable paper free of wood pulp particles. Exposure is carried out as described in Example VII and illustrated in FIG. 7, and will result in the single copy comprising elements 10, 9*a* and 8*a* as illustrated in FIG. 12.

*Example XII (FIGS. 13–14)*

In this case, the hectographic ink sheet comprises a backing sheet 12 to which three layers have been applied, namely hectographic ink layer 4, an interposed layer 13 of a composition which will not absorb infrared rays, and a latently adhesive layer 5.

Layer 13 has a weight of 4 g./m.² and is composed of 50% hard paraffin having a melting point of 60° C. and 50% active bentonite.

Adhesive layer 5 has a thickness of 0.015 mm. and the composition described in Example VIII.

Exposure and separation is carried out as illustrated in FIGS. 13 and 14.

It will be understood that each of the elements described above, or two or more together, may also find a useful application in other types of image reproducing arrangements differing from the types described above.

According to preferred embodiments of the present invention which are illustrated in FIGS. 15–24, the layer of coloring material of the color transfer sheet is covered with a layer of latently adhesive material, and a layer of latently adhesive material covers one face of the master blank so that, upon activation of the heat responsive latently adhesive layers, there will adhere to the backing sheet of the master blank, in the indicated sequence, the adhesive layer of the master blank, the activated portions of the adhesive layer of the color transfer sheet and corresponding portions of the color layer.

It is also within the scope of the present invention to utilize a color transfer sheet which comprises only a backing sheet and a layer of coloring material thereon, in combination with a master blank comprising a backing sheet and a heat responsive latently adhesive layer thereon. Upon contacting the layer of coloring material of the color transfer sheet and the latently adhesive layer of the master blank, and subjecting portions of the contacting layers to an elevated temperature at least equal to the melting point of the latently adhesive layer, corresponding portions of the layer of coloring material will be adhered to the master blank when the same is separated from the color sheet after cooling to below softening point of the latently adhesive layer.

Preferably, the latently adhesive layers, particularly when the color transfer sheet as well as the master blank include a latently adhesive layer, will consist of natural or synthetic resins or wax, and the melting point of the resin and/or wax composition on the master blank or copy sheet will be so chosen or adjusted that it is preferably lower and in any event not higher than the melting point of the latently adhesive layer forming part of the color transfer sheet.

It appears that excellent results are achieved according to the present invention when the sheet which is to accept selected portions of the color layer of the transfer sheet includes a latently adhesive layer of natural or synthetic resin or wax which may be activated by heat, and when the transfer sheet also is formed with a latently adhesive layer, superposed upon the transferable color layer, so that the two latently adhesive layers can be arranged in contact with each other. The melting points of the latently adhesive layers should be below the melting point of the transferable layer, such as a layer of coloring material, and in any event the melting points of the adhesive layers must not be higher than that of the transferable layer.

Many different resin and wax compositions may serve for the purpose of the present invention and the melting points of the latently adhesive layers, i.e., the temperatures to which the latently adhesive layers or portions thereof must be heated in order to be activated, can be easily adjusted as desired, preferably so that the melting point of the adhesive layer of the master blank or copy sheet will be somewhat lower than the melting point of the adhesive layer of the color transfer sheet.

Thus, for instance, the melting point of candelilla wax is 72° C., while the melting point of montan wax is above 80° C. Assuming that the adhesive layer of the color transfer sheet melts, or is activated at 75° C., mixtures of candelilla and montan wax can be produced which will have the desired melting point of somewhat below 75° C. The addition of waxes of even lower melting point, such as beeswax which has a melting point of about 62° C., to candelilla wax will permit forming of latently adhesive layers having a melting point which may be as low as 65° C. or thereabout.

Preferably, the two contacting latently adhesive layers will consist of substantially the same types of waxes or resins, modified only to the extent necessary to obtain the desired difference in the melting temperatures of the two adhesive layers. Adhesive compositions or materials with little difference between their melting points and great adhesive attraction relative to each other are preferred.

A great variety of resins and waxes taken alone or as mixtures thereof are useful for the purpose of the present invention and can be suitably adjusted with respect to their melting points relative to each other and relative to the melting point of the coloring material. The abovementioned candelilla wax, or montan wax mixed with other waxes and resins, phenolic resins, particularly such of the Resol type, modified phenolic resins, terpenephenolic resins such as those commercially available as Alresen 214R or 191R, have been found highly suitable. The melting point can be easily adjusted to the desired temperature. For instance, Alresen 214R melts at about 68° C. and Alresen 191R at about 62° C. A melting point above 70° C. can be reached by adding higher melting phenolic resins.

Three suitable compositions of latently adhesive layer are given below by way of example only.

*Example XIII*

| | |
|---|---|
| Wool wax | 35 g. |
| Montan wax | 50 g. |
| Softening range | 62° C.–65° C. |

*Example XIV*

| | |
|---|---|
| Wool wax | 30 g. |
| Beeswax | 30 g. |
| Candelilla wax | 30 g. |
| Montan wax | 40 g. |
| Softening range | 57° C.–62° C. |

*Example XV*

| | |
|---|---|
| Candelilla wax | 75 g. |
| Wool wax | 25 g. |
| Softening range | 57° C.–60° C. |

Very good results according to the present invention are achieved by using candelilla wax as the latently adhesive layer for the master blank and the color transfer sheet, combined with a coloring layer having the composition described in Example I. The interaction between the various layers of the color transfer sheet and the master blank or copy sheet is greatly improved by the provision of two latently adhesive layers, one forming the free face of the color transfer sheet and the other forming the free face of the master blank or the like.

The present invention is suitable or producing hectographic printing forms from which copies can be made in an alcohol duplicator or the like, as well as for producing lithographic printing forms for direct and indirect lithographic processes. The present invention furthermore can be used for improving regular photocopying processes. The use of copy sheets which carry the latently adhesive layer will result in even and complete contact with the transfer sheet so that the quality of the copies which are formed by application of heat will be considerably improved.

It is important, however, to use for the coloring layer of hectographic color transfer sheets and the like which are to be used in connection with the present invention, inks or dyestuffs which do not absorb infrared light, i.e., not to use pigment dyes but rather aniline dyestuffs, particularly triphenylmethane dyes.

The hectographic color transfer sheets may include a coloring layer consisting of a triphenylmethane dye embedded, in conventional manner, in fat, wax or the like. Such layer usually has a melting point of somewhat above 70° C. In connection therewith preferably an adhesive layer which will become adhesive at a temperature of about 62° C. may be applied to the free face of the coloring layer.

It has been found advantageous to use latently adhesive layers which have a relatively sharp defined softening point, for instance, so as to be completely solid at 55° C. and effectively adhesive at slightly above 60° C. The preferred softening temperature in each case depends on the type of the resins, softeners and the like which are used as well as on the composition of the coloring layer of the transfer sheet.

As pointed out further above, the melting point of the color transfer layer should be somewhat higher than the temperature at which the latently adhesive layer becomes actively adhesive. As a borderline case, the two layers may melt or become actively adhesive at the same temperature. However, the melting point of the adhesive wax layer must not be higher than that of the coloring layer which, for instance, according to Example I, may include 50% of oils, fats and wax, since otherwise diffusion of superposed portions of the two layers could be avoided when the same are heated to the melting point of the adhesive layer and thus above the melting point of the coloring layer.

FIGS. 15–24 illustrate the preferred embodiment of the present invention according to which the master blank or the like includes a latently adhesive layer.

Figure 15:
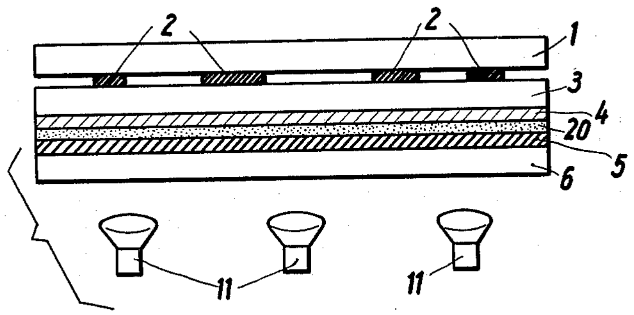
Figure 16:
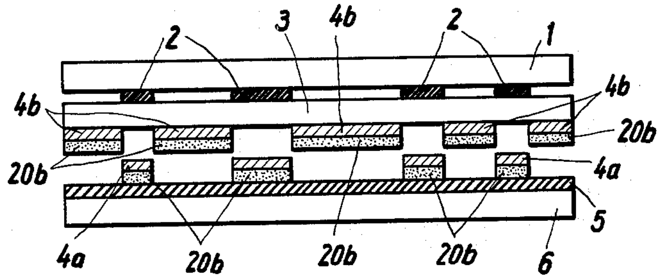

FIGS. 15 and 16 schematically illustrate the preparation of a printing form by reflex exposure of an image-carrying sheet with infrared radiation.

It will be seen that the image-carrying sheet member 1 is placed with image-forming portions 2 onto a color transfer sheet which comprises backing sheet 3, coloring layer 4 and latently adhesive top layer 20. Top layer 20 contacts latently adhesive layer 5 of a master blank comprising backing layer 6 and latently adhesive layer 5. Reflex exposure is carried out by operation of infrared lamps 11.

As shown in FIG. 16, the thus formed master carrying a transferable image, corresponding to image forming portions 2 of the image-carrying sheet member, is separated after cooling of the exposed sheet assembly. Portions 4a and 20a of the hectographic coloring sheet or the like adhere now to adhesive layer 5 of the master sheet, while portions 4b and 20b which were not exposed to heat, continue to adhere to backing sheet 1 of the color transfer sheet.

Figures 17, 18:
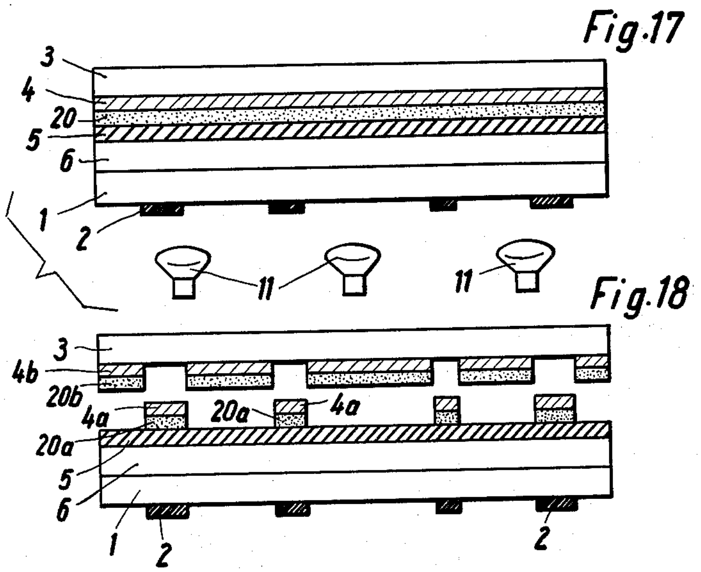
Figures 19, 20:
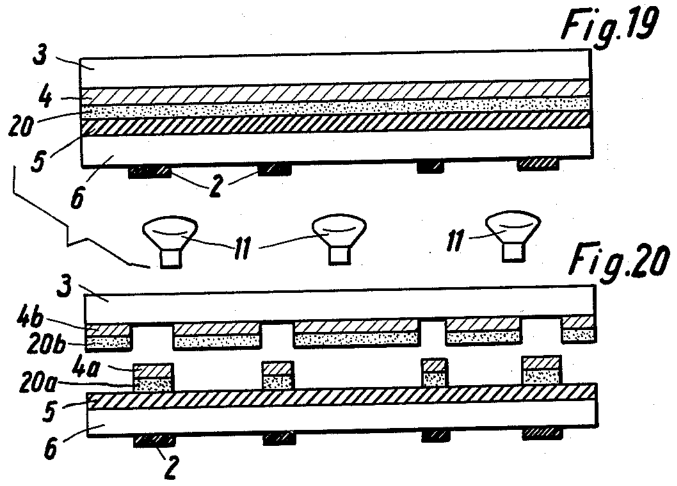

FIG. 17 and FIG. 18 illustrate the invention when carried out with direct exposure. In this case, the image carrying sheet is placed in contact with backing sheet 6 of the master sheet, with the image forming portions 2 facing toward infrared lamps 11. According to the embodiment illustrated in FIGS. 19 and 20 the printing form is produced in a manner somewhat similar to that described in connection with FIGS. 17 and 18. However, a reproducible hectographic mirror image is formed on the rear face of the backing sheet which carries the image which is to be reproduced on its front face. Exposure is carried out by passing infrared rays from lamps 11 through the image-carrying member in the direction from the image-carrying face thereof toward latently adhesive layer 5 on the opposite face of backing sheet 6, with the color transfer sheet arranged behind the image-carrying member so that latently adhesive layer 5 of the image-carrying member is in contact with latently adhesive layer 20 of the color transfer sheet.

Figure 21:
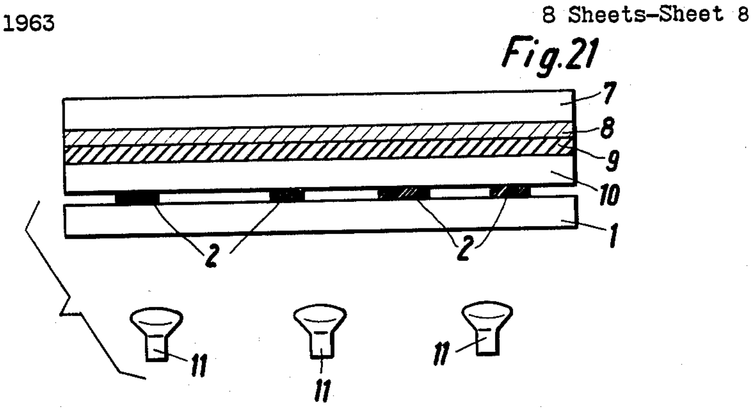
Figure 22:
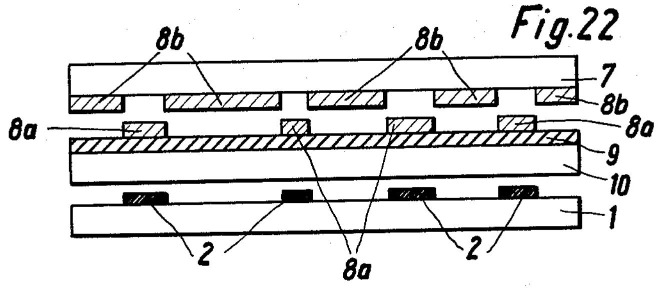

FIGS. 21 and 22 illustrate preparation of a single positive copy by direct exposure. In this case, the hectographic color sheet is replaced with a non-reproducible transfer sheet such as a carbon paper. A copy sheet 10 with latently adhesive layer 9 thereon is placed in contact with carbon paper or the like 7, 8 so that color transfer layer 8 will contact adhesive layer 9. The image carrying sheet member is placed so that the image forming portions 2 contact the rear face of backing sheet 10 of the copy sheet. Exposure is carried out by means of infrared lamps 3 which face backing sheet 10. It will be seen in FIG. 22 that upon exposure cooling and separation, color layer portions 8a adhere to adhesive layer 9 of the copy sheet, while color layer portions 8b which correspond to the image free portions of the image carrying sheet remain adhered to backing sheet 7.

Figure 23:
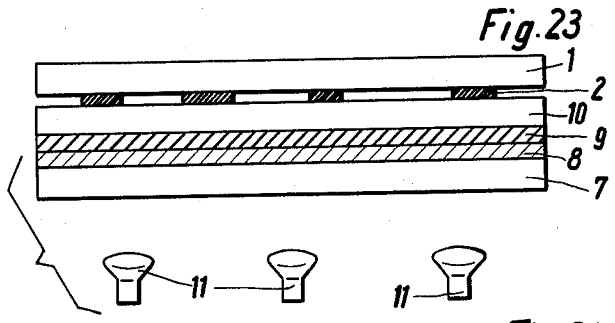
Figure 24:
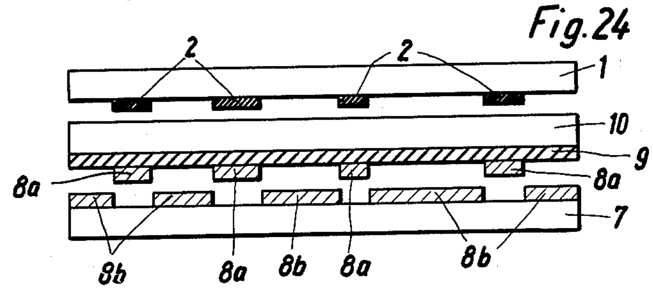

FIGS. 23 and 24 illustrate preparation of a single positive copy of an image by reflex exposure.

Copy sheet 10 is placed against image carrying sheet member 1 with image forming portions 2 facing towards the copy sheet and the latently adhesive layer 9 of copy sheet 10 facing away from image forming portions 2. The non-reproducible color transfer sheet 7, 8 is then placed onto copy sheet 9, 10, with non-reproducible color layer 8 contacting adhesive layer 9. Upon separation, it will be seen that the portions of layer 8a which correspond to the image forming portions now adhere to copy sheet 10, while layer portions 8b which correspond to the image free portions remain in their original position.

While the invention has been illustrated and described as embodied in an arrangement for producing hectographic master sheets, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of reproducing an image, comprising the steps of forming a multilayer structure including, the indicated sequence, a first backing sheet, a layer of a coloring material adhering to said first backing sheet, a layer of latently adhesive material adapted to become actively adhesive at an elevated temperature below the softening point of said coloring material, said adhesive material being of such composition that by heating to said elevated temperature and subsequent cooling its bond to contacting portions of said layer of coloring material is stronger than the bond of said portions of said layer of coloring material to said first backing sheet; and a second backing sheet, said layer of adhesive material adhering to said second backing sheet; placing an image carrying sheet member having image forming and image free portions on said multilayer structure, said image forming portions of said image carrying sheet having a greater specific heat transfer capacity than said image free portions thereof so that upon exposure of said multilayer structure to predetermined infrared radiation portions of said layer of latently adhesive material corresponding to said image forming portions will be heated to said elevated temperature being below the softening point of said coloring material, the latter thus remaining in solid, unsoftened condition, while the portions of said layer of latently adhesive material corresponding to said image forming portions are activated and portions of said layer of latently adhesive material corresponding to said image free portions will remain below said elevated temperature and thus in latently adhesive, inactivated state; exposing said multilayer structure to said predetermined infrared radiation; allowing the thus activated portions of said layer of latently adhesive material to cool below said elevated temperature; and separating said second backing sheet from said multilayer structure, whereby the portions of said adhesive layer and of said coloring layer corresponding to the image forming portions of said multilayer structure will firmly adhere to said second backing sheet thus reproducing said image thereon.

2. A method of reproducing an image as defined in claim 1, wherein said image carrying sheet member is placed on said first backing sheet.

3. A method of reproducing an image as defined in claim 1 wherein said infrared radiation to which said placed on said second backing sheet.

4. A method of reproducing an image as defined in claim 1 wherein said infrared radiation to which said multilayer structure is exposed emanates from a source spaced from and facing said second backing sheet.

5. A method of reproducing an image as defined in claim 1, wherein a layer of material substantially incapable of absorbing infrared radiation is interposed between said coloring and said adhesive layer.

6. A method of reproducing an image as defined in claim 1, wherein said coloring material is a hectographic ink.

7. A method of reproducing an image as defined in claim 1, wherein said layer of latently adhesive material consists essentially of a softener-containing synthetic resin.

8. In a method of reproducing an image, the steps of forming a multilayer structure including a color transfer sheet comprising a first backing sheet, a layer of coloring material adhering to said first backing sheet and a first layer of latently adhesive material adapted to become actively adhesive at an elevated temperature below the softening point of said coloring material, said adhesive material of said first layer of latently adhesive material being of such composition that by heating to said elevated temperature and subsequent cooling its bond to contacting portions of said layer of coloring material is stronger than the bond of said portions of said layer of coloring material to said first backing sheet, and a master blank comprising a second backing sheet and a second layer of laterally adhesive material, with said first and second layers of adhesive material contacting each other, the melting point of the adhesive material of said second layer of latently adhesive material not exceeding the melting point of the adhesive material of said first layer of latently adhesive material; placing an image carrying sheet having image forming and image free portions on said multilayer structure, said image forming portions of said image carrying sheet member having a greater specific heat transfer capacity than said image free portions thereof so that, upon exposure of said multilayer structure including said image carrying sheet member to predetermined infrared radiation, portions of said layers of latently adhesive material corresponding to said image forming portions will be heated to said elevated temperature being below the softening point of said coloring material the latter thus remaining in solid, unsoftened condition, while the portions of said layer of latently adhesive material corresponding to said image forming portions are activated and portions of said layers of latently adhesive material corresponding to said image free portions will remain below said elevated temperature and thus in latently adhesive, inactivated state; exposing said multilayer structure to said predetermined infrared radiation thereby activating the portions of said latently adhesive layers corresponding to said image forming portions and adhering the thus activated portions of said adhesive layers to each other and to corresponding portions of said layer of coloring material and of said second backing sheet; allowing the thus activated portions of said adhesive layers to cool below the melting point of the adhesive material of said second layer of latently adhesive material; and separating said second backing sheet from said multilayer structure, whereby the portions of said coloring layer corresponding to the image forming portions of said multilayer structure will be firmly adhered to said second backing sheet, thus reproducing said image on said master blank.

9. A method as defined in claim 8, wherein the melting point of the adhesive material of the second layer of latently adhesive material is below the melting point of the adhesive material of the first layer of latently adhesive material.

10. A method as defined in claim 8, wherein said adhesive material of said latently adhesive layers is selected from the group consisting of natural and synthetic resins and waxes and mixtures thereof which are adapted firmly to adhere to each other.

11. A method according to claim 10 wherein at least one of said latently adhesive layers includes montan wax as an essential constituent thereof.

12. A method according to claim 10 wherein at least one of said latently adhesive layers includes candelilla wax as an essential constituent thereof.

13. In an image reproducing arrangement, in combination, a plurality of superposed layers, comprising, in the indicated sequence, a first backing sheet; a second backing sheet; a layer of coloring material adhering to said first backing sheet; and a layer of latently adhesive material adhering to said second backing sheet, said layers of coloring and latently adhesive material contacting each other and being interposed between said first and second backing sheets, said latently adhesive material being adapted to become actively adhesive at a predetermined elevated temperature which is below the softening point of said coloring material, and the composition of said adhesive material being such that by heating to said predetermined elevated temperature but below the softening point of said coloring material and subsequent cooling its bond to contacting portions of the solid layer of coloring material is stronger than the bond of said portions of said layer of coloring material to said backing sheet, whereby upon heating portions of said adhesive layer to said predetermined elevated temperature corresponding portions of the backing sheet contacting said adhesive layer, and of said coloring material will be firmly adhered to each other by the interposed activated portions of said adhesive layer.

14. In an image reproducing arrangement, in combination, a color transfer sheet comprising a first backing sheet, a layer of coloring material adhering to said first backing sheet and a first layer of latently adhesive material adapted to become actively adhesive at an elevated temperature below the sofetening point of said coloring material, adhering to the free face of said layer of coloring material, said adhesive material of said first layer of latently adhesive material being of such composition that by heating to said elevated temperature but below the softening point of said coloring material and subsequent cooling its bond to contacting portions of the solid layer of coloring material is stronger than the bond of said portions of said layer of coloring material to said first backing sheet; and a master blank comprising a second backing sheet and a second layer of latently adhesive material superposed upon said color transfer sheet with said latently adhesive layers of said color transfer sheet and said master blank contacting each other, the adhesive material of said second layer of latently adhesive material being such that the melting point thereof does not exceed the melting point of said first layer of latently adhesive material, whereby upon heating of portions of said adhesive layers to said elevated temperature, said adhesive layers and corresponding portions of said coloring material and said second backing sheet will be firmly adhered to each other by the interposed activated portions of said adhesive layers.

References Cited by the Examiner

UNITED STATES PATENTS

| | | | |
|---|---|---|---|
| 2,501,495 | 3/1950 | Carrol et al. | 101—149.4 X |
| 2,762,715 | 9/1956 | Newman. | |
| 3,122,997 | 3/1964 | Raczynski et al. | 101—149.2 |

FOREIGN PATENTS

| | | |
|---|---|---|
| 141,859 | 6/1951 | Australia. |

DAVID KLEIM, *Primary Examiner.*

ROBERT E. PULFREY, *Examiner.*

T. D. TAYLOR, J. A. BELL, *Assistant Examiners.*